United States Patent
Kinoshita

(10) Patent No.: US 9,634,537 B2
(45) Date of Patent: Apr. 25, 2017

(54) MOTOR PROVIDED WITH TERMINAL BLOCK

(71) Applicant: FANUC CORPORATION, Yamanashi (JP)

(72) Inventor: Shinichi Kinoshita, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 322 days.

(21) Appl. No.: 14/341,968

(22) Filed: Jul. 28, 2014

(65) Prior Publication Data
US 2015/0035396 A1 Feb. 5, 2015

(30) Foreign Application Priority Data
Jul. 31, 2013 (JP) ................... 2013-159352

(51) Int. Cl.
H02K 5/22 (2006.01)
(52) U.S. Cl.
CPC .................... H02K 5/225 (2013.01)
(58) Field of Classification Search
CPC .......... H02K 5/225; H02K 3/50; H02K 3/522; H02K 11/225; H02K 24/00; H02K 15/00; H02K 15/04; H02K 15/10; H02K 29/12
See application file for complete search history.

(56) References Cited

U.S. PATENT DOCUMENTS

| | | | | |
|---|---|---|---|---|
| 4,656,378 A | * | 4/1987 | Atherton | H01R 4/2462 310/68 C |
| 6,106,324 A | * | 8/2000 | Kwapien | H02K 3/522 29/596 |
| 2004/0119350 A1 | * | 6/2004 | Miya | H02K 3/522 310/71 |
| 2013/0175853 A1 | * | 7/2013 | Chamberlin | H02K 3/50 307/9.1 |

FOREIGN PATENT DOCUMENTS

| | | |
|---|---|---|
| JP | S63-066046 U | 5/1988 |
| JP | 2002-125348 A | 4/2002 |
| JP | 2005065440 A | 3/2005 |
| JP | 2006006054 A | 1/2006 |
| JP | 2008172932 A | 7/2008 |
| JP | 2011-234523 A | 11/2011 |

OTHER PUBLICATIONS

English Translation of Japanese Publication No. 2008172932, published Jul. 24, 2008, 22 pages.
Concise Explanation of JP S63-066046, published May 2, 1988, 1 page.
English Machine Translation for Japanese Publication No. 2002-125348 published Apr. 26, 2002, 17 pages.
English Machine Translation for Japanese Publication No. 2011-234523 published Nov. 17, 2011, 47 pages.

* cited by examiner

*Primary Examiner* — Tran Nguyen
(74) *Attorney, Agent, or Firm* — Fredrikson & Byron, P.A.

(57) ABSTRACT

A motor which can reliably prevent varnish from ending up entering a terminal block. The motor is provided with a terminal block to which lead wires of coils are connected. The terminal block has a bottom wall, a plurality of side walls which face each other, a terminal part which is provided between adjoining side walls, and a dam wall which is arranged at a position closer to the coils than the terminal part and which is formed integrally with the bottom wall and side walls without clearance. The dam wall has a lead wire holding part for holding a lead wire.

9 Claims, 6 Drawing Sheets

MOTOR PROVIDED WITH TERMINAL BLOCK

BACKGROUND OF THE INVENTION

1. Field of the Invention

The present invention relates to a motor comprising a terminal block to which lead wires of coils are connected.

2. Description of the Related Art

To improve the insulation, heat resistance, and strength of the coils which are wound about a stator of a motor, the coils are impregnated with varnish. The work of impregnating the coils with varnish is generally performed by dropping the varnish on the coil ends of the coils. In this case, the varnish sometimes ends up entering the terminal parts which are set inside of the terminal block of the motor and as a result end up obstructing the insertion and withdrawal of cables to the terminal parts. To prevent varnish from entering inside of the terminal block in this way, a configuration which attaches a member which blocks the varnish at the housing of the terminal block is known (for example, Japanese Patent Publication No. 2005-65440A or Japanese Patent Publication No. 2006-6054A).

In conventional motors, the varnish may enter the terminal block from the slight clearance formed between the member for preventing entry of varnish and the housing of the terminal block. In view of this, the object of the present invention is to provide a motor which can reliably prevent varnish from entering into the terminal block.

SUMMARY OF INVENTION

The motor according to the present invention comprises a coil which is wound around a stator and in which a varnish is impregnated; and a terminal block to which a lead wire of the coil is connected. The terminal block includes a bottom wall; a first side wall and second side wall extending from the bottom wall so as to face each other; a terminal part which is provided between the first side wall and the second side wall and to which a front end of the lead wire is connected; and a dam wall which is arranged at a position closer to the coil than the terminal part and which is formed integrally with the bottom wall, the first side wall, and the second side wall without clearance. The dam wall includes a lead wire holding part for holding the lead wire.

The terminal block may include a plurality of dam walls which are arranged separated from each other in the extension direction of the lead wire. Further, the bottom wall may be fastened at a position closer to a coil end of the coil than the stator. Further, the lead wire holding part may have a wall surface of a shape corresponding to at least part of the outer circumferential surface of the lead wire. The wall surface of the lead wire holding part may contact the outer circumferential surface of the lead wire. Further, at least part of the wall surface of the lead wire holding part may be formed with a recessed part or a projecting part.

Further, at least part of the dam wall at the end face at the opposite side to the terminal part may be formed with a recessed part or a projecting part. Further, the dam wall may include a porous material which can absorb the varnish at least at its surface. Further, the dam wall may have a length of 0.5 times or more of the diameter of the lead wire in the extension direction of the lead wire. Further, the lead wire holding part may be formed to be recessed inward from the top end face of the dam wall and include a groove which extends in the extension direction of the lead wire.

BRIEF DESCRIPTION OF THE DRAWINGS

The above and other objects, features, and advantages of the present invention will become clearer from the following description of preferred embodiments with reference to the attached drawings, in which.

DETAILED DESCRIPTION

Figure 1:
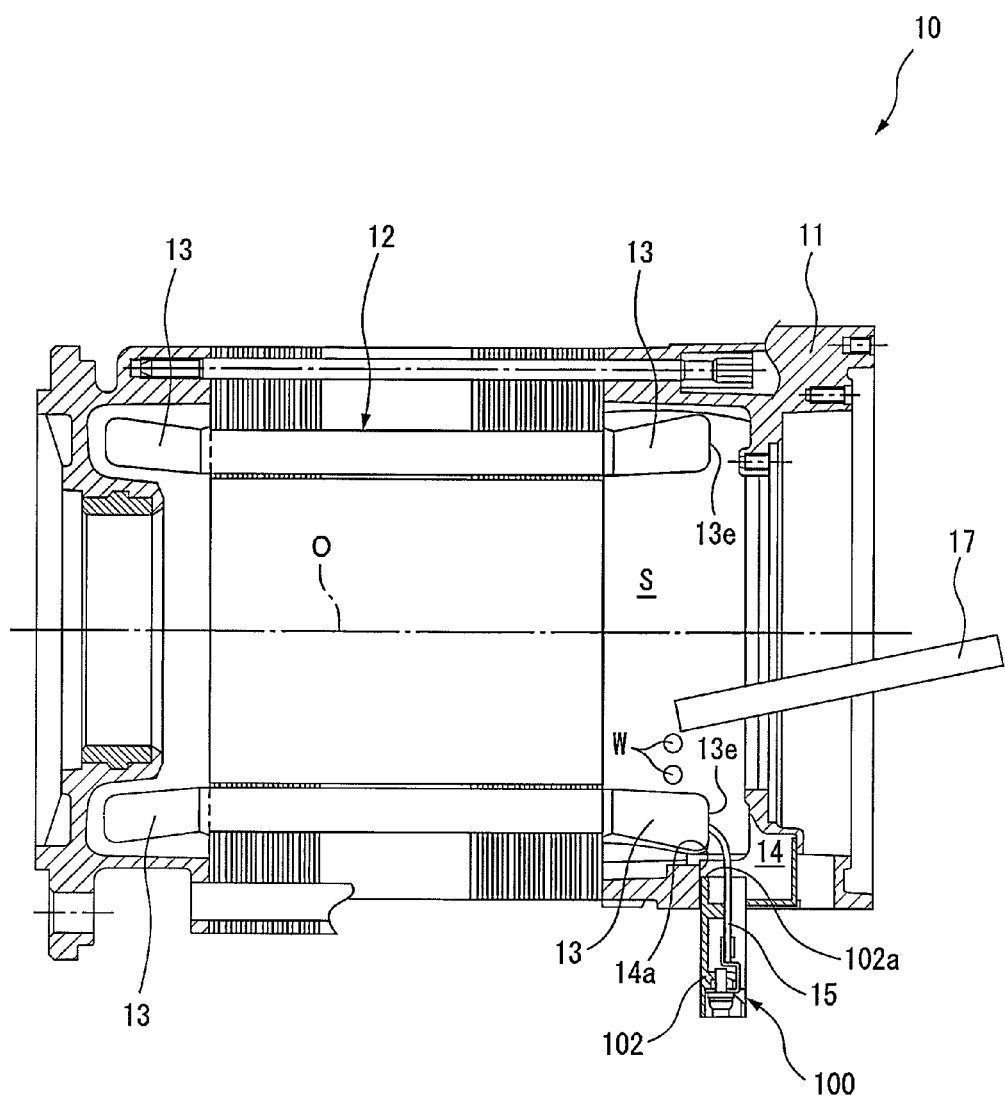
FIG. 1 is a cross-sectional view of a motor according to an embodiment of the present invention.

Below, embodiments of the present invention will be explained in detail based on the drawings. First, referring to FIG. 1, the configuration of a motor 10 according to an embodiment of the present invention will be explained. The motor 10 is provided with a housing 11 which defines an internal space S, a stator 12 which is fastened in the internal space S of the housing 11, and a terminal block 100 which is fastened to the housing 11. The stator 12 has coils 13 wound around it.

At the housing 11, a terminal block mount 14 is formed. The terminal block mount 14 is an opening part for communicating the internal space S of the housing 11 and an external space and is formed in proximity to a coil end 13e of the coil 13. The terminal block 100 is fastened to the wall surface 14a which defines the terminal block mount 14 and is arranged near the coil end 13e of the coil 13. At this terminal block 100, the front ends of cylindrically shaped lead wires 15 extending from the coil 13 are connected.

Figure 2:
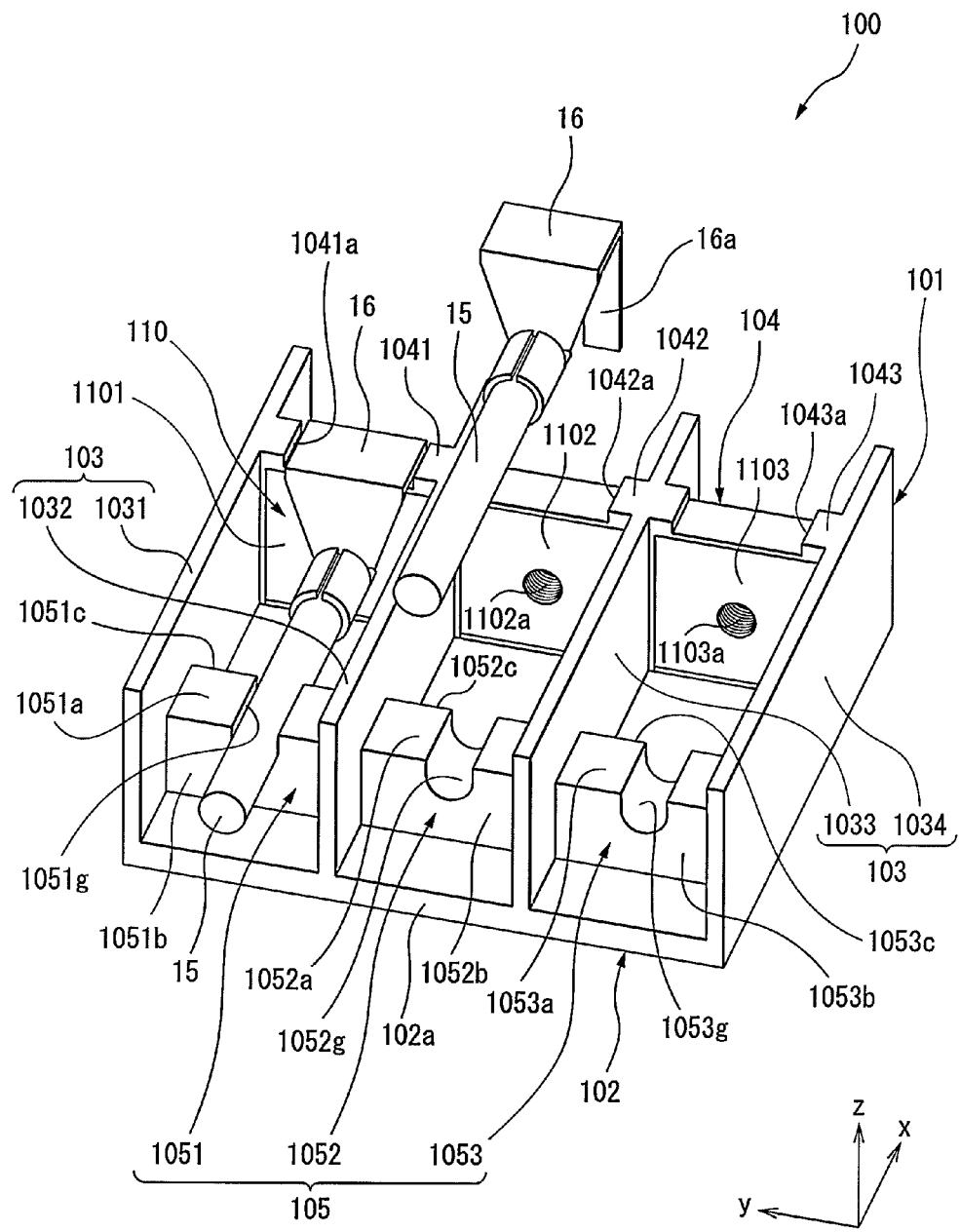
FIG. 2 is a perspective view of a terminal block which is shown in FIG. 1.

Next, referring to FIG. 2, the configuration of the terminal block 100 according to an embodiment of the present invention will be explained. Note that, in the following explanation, using the directions shown by the xyz coordinates in FIG. 2 as a reference, the direction indicated by the arrow of the x-axis is defined as the front direction, the direction indicated by the arrow of the y-axis is defined as the left direction, and the direction indicated by the arrow of the z-axis is defined as the upper direction. Here, the x-axial direction substantially corresponds to the extension direction of the lead wires 15 connected to the terminal block 100.

The terminal block 100 is provided with a housing 101; and terminal parts 110 attached to the housing 101. The housing 101 is provided with a bottom wall 102; and a side wall 103 extending upward from the bottom wall 102. The bottom wall 102 is a plate-shaped member of a square shape when viewed from the top. The bottom wall 102, as shown in FIG. 1, is fastened at a position closer to the coil end 13e of the coil 13 than the stator 12. More specifically, the bottom wall 102 is fastened to the wall surface 14a of the terminal block mount 14 so that the rear end part 102a of the bottom wall 102 adjoins the coil end 13e of the coil 13 at the outside in the radial direction.

The side wall 103 extends from the bottom wall 102 so as to be orthogonal to the bottom wall 102. The side wall 103 includes a first side wall 1031, second side wall 1032, third side wall 1033, and fourth side wall 1034. The first side wall 1031 rises up from the left end edge of the bottom wall 102 and extends from the rear end to the front end of the bottom wall 102.

On the other hand, the fourth side wall 1034 rises up from the right end edge of the bottom wall 102 and extends from the rear end to the front end of the bottom wall 102. The second side wall 1032 is arranged at a position separated from the first side wall 1031 in the right direction and extends from the rear end to the front end of the bottom wall 102 so as to face the first side wall 1031.

Further, the third side wall 1033 is arranged at a position between the second side wall 1032 and the fourth side wall 1034 and extends from the rear end to the front end of the bottom wall 102 so as to face both of the second side wall 1031 and fourth side wall 1034.

The housing 101 includes a terminal holding wall 104 provided at the front region of the housing 101 and extending between the first side wall 1031 and the fourth side wall 1034. The terminal holding wall 104 extends from the first side wall 1031 to the right direction, intersects the second side wall 1032 and third side wall 1033, and is connected to the fourth side wall 1034. Further, the terminal holding wall 104 is formed to be orthogonal to the bottom wall 102 and the side wall 103, and extends from the bottom wall 102 to the top end faces of the side wall 103.

The terminal holding wall 104 has a first terminal holding wall 1041 extending between the first side wall 1031 and the second side wall 1032; a second terminal holding wall 1042 extending between the second side wall 1032 and the third side wall 1033; and a third terminal holding wall 1043 extending between the third side wall 1033 and the fourth side wall 1034. The first terminal holding wall 1041, the second terminal holding wall 1042, and the third terminal holding wall 1043 have the same shapes.

The first terminal holding wall 1041 includes a recessed part 1041a which is formed so as to be recessed downward from its top end face. Further, the first terminal holding wall 1041 includes a through hole (not shown) which runs from its rear end face to front end face. This through hole is arranged at the approximate center of the first terminal holding wall 1041.

Similarly, the second terminal holding wall 1042 includes a recessed part 1042a which is formed so as to be recessed downward from its top end face and a through hole (not shown) which runs from the rear end face to front end face of the second terminal holding wall 1042. Similarly, the third terminal holding wall 1043 includes a recessed part 1043a which is formed so as to be recessed downward from its top end face and a through hole (not shown) which runs from the rear end face to front end face of the third terminal holding wall 1043.

The housing 101 includes a dam wall 105 disposed at the rear region thereof and extending between the first side wall 1031 and the fourth side wall 1034. The dam wall 105 is arranged at a position rearwardly separated from the terminal holding wall 104 and somewhat frontwardly separated from the rear end part 102a of the bottom wall 102. The dam wall 105 is formed to be orthogonal to the bottom wall 102 and the side wall 103, and extends from the bottom wall 102 to a predetermined height lower than the top end face of the side wall 103. This dam wall 105 is formed integrally with the bottom wall 102, first side wall 1031, second side wall 1032, third side wall 1033, and fourth side wall 1034 without clearance.

More specifically, the dam wall 105 has a first dam wall 1051 extending between the first side wall 1031 and the second side wall 1032; a second dam wall 1052 extending between the second side wall 1032 and the third side wall 1033; and a third dam wall 1053 extending between the third side wall 1033 and the fourth side wall 1034. Note that the first dam wall 1051, second dam wall 1052, and third dam wall 1053 have the same shapes.

The first dam wall 1051 has a groove 1051g which is formed so as to be recessed inward from its top end face 1051a. The groove 1051g extends from the rear end face 1051b to the front end face 1051c of the first dam wall 1051 along the x-axis. This groove 1051g has a wall surface which corresponds to the outer circumferential surface of a cylindrically shaped lead wire 15.

More specifically, the wall surface of the groove 1051g includes a circumferential surface which has a radius the same or slightly smaller than the radius of the outer circumferential surface of the lead wire 15. The first dam wall 1051 has a predetermined x-axial direction length. For example, the first dam wall 1051 has an x-axial direction length of 0.5 times or more of the diameter of the lead wire 15.

Similarly, the second dam wall 1052 has a groove 1051g which is formed so as to be recessed inward from its top end face 1052a. The third dam wall 1053 has a groove 1053g which is formed so as to be recessed inward from its top end face 1053a. The wall surfaces of these groove 1052g and groove 1053g also have radii the same or slightly smaller than the radius of the outer circumferential surface of the lead wire 15.

The terminal part 110 includes a first terminal part 1101; second terminal part 1102; and third terminal part 1103. At the center part of the first terminal part 1101, a screw part (not shown) which extends from the body part of the first terminal part 1101 to the front direction is formed. The first terminal part 1101 is attached to the rear end face of the first terminal holding wall 1041 so that the screw part of the first terminal part 1101 is inserted into a through hole which is provided in the first terminal holding wall 1041. In this way, the first terminal part 1101 is attached to the housing 101 between the first side wall 1031 and the second side wall 1032.

Similarly, at the center part of the second terminal part 1102, a screw part 1102a which extends from the body part of the second terminal part 1102 to the front direction is formed. The second terminal part 1102 is attached to the rear end face of the second terminal holding wall 1042 so that this screw part 1102a is inserted into a through hole which is provided in the second terminal holding wall 1042.

Similarly, at the center part of the third terminal part 1103, a screw part 1103a which extends from the body part of the third terminal part 1103 to the front direction is formed. The third terminal part 1103 is attached to the rear end face of the third terminal holding wall 1043 so that this screw part 1103a is inserted into a through hole which is provided in the third terminal holding wall 1043.

According to the present embodiment, a total of three lead wires 15 are connected to the terminal block 100. Fastener 16 is attached to the front end of each of the lead wires 15. The fastener 16 is made of a metal member having a bifurcated clamping part 16a, and electrically contacts the conductive wire of the lead wire 15. The first lead wire 15 is connected to the first terminal part 1101 which is attached to the first terminal holding wall 1041.

Specifically, the fastener 16 provided at the front end of the first lead wire 15 is fit into the recessed part 1041a formed at the first terminal holding wall 1041 so as to be put from the upper side of the first terminal holding wall 1041. At this time, the clamping part 16a of the fastener 16 clamps the first terminal holding wall 1041 from the front and rear, and then electrically contacts the first terminal part 1101 attached to the first terminal holding wall 1041. In this way, the first lead wire 15 is electrically connected to the first terminal part 1101.

On the other hand, at the screw part formed at the first terminal part 1101, an external cable connected to a voltage source for driving the motor 10 or other external device is inserted. In this way, the first lead wire 15 is electrically connected to the external cable, and thus, is electrically connected to the external device via the external cable.

The front end of the first lead wire 15 is connected to the first terminal part 1101, while a part of the first lead wire 15 positioned slightly rearward of the front end thereof is fit inside of a groove 1051g provided at the first dam wall 1051 and held by the groove 1051g. In this state, the wall surface of the groove 1051g tightly contacts the outer circumferential surface of the lead wire 15 over half of the radius in the lower side of that outer circumferential surface. In this way, the groove 1051g functions as a lead wire holding part for holding the lead wire 15. As shown in FIG. 2, the first lead wire 15 is connected to the terminal part 1101 so as to extend along the x-axis.

Similarly, the second lead wire 15 is connected to the second terminal part 1102. Note that, in order to facilitate understanding, a state before the second lead wire 15 is attached to the second terminal holding wall 1042 is shown in FIG. 2. The fastener 16 which is provided at the front end of the second lead wire 15 is fit into the recessed part 1042a of the second terminal holding wall 1042. Due to this, it electrically contacts the second terminal part 1102 which is attached to the second terminal holding wall 1042. In this way, the second lead wire 15 is electrically connected to an external device via an external cable connected to the second terminal part 1102.

Further, a part of the second lead wire 15 positioned slightly rearward of the front end of the second lead wire 15 is fit into the groove 1052g formed on the second dam wall 1052, and held by the groove 1052g. At this time, the wall surface of the groove 1052g tightly contacts the outer circumferential surface of the lead wire 15 over half of the circumference in the bottom side of the outer circumferential surface.

Similarly, the third lead wire 15 is connected to a third terminal part 1103. Note that, in order to facilitate understanding, the third lead wire 15 is omitted in FIG. 2. The fastener 16 provided at the front end of the third lead wire 15 is also fit in the recessed part 1043a of the third terminal holding wall 1043. Due to this, it electrically contacts the third terminal part 1103 which is attached to the third terminal holding wall 1043. In this way, the third lead wire 15 is electrically connected to an external device via an external cable connected to the second terminal part 1102.

Further, a part of the third lead wire 15 positioned slightly rearward of the front end of the third lead wire 15 is fit into the groove 1053g formed on the third dam wall 1053, and held by the groove 1053g. At this time, the wall surface of the groove 1053g tightly contacts the outer circumferential surface of the lead wire 15 over half of the circumference in the bottom side of the outer circumferential surface.

Next, referring to FIG. 1 to FIG. 3, the function of the terminal block 100 according to the present embodiment will be explained. As shown in FIG. 1, the work of impregnating the coils 13 with varnish is performed while making the motor 10 rotate about the center axis of the motor 10 and dropping varnish W on the coil end 13e of the coil 13 with a varnish coating nozzle 17.

If dropping varnish W on the coil 13 in this way, part of the varnish which was dropped may travel from the coil end 13e along the wall surface 14a of the terminal block mount 14, reach the end part 102a of the bottom wall 102, and flow into the inside of the terminal block 100. Alternatively, part of the varnish which was dropped may travel from the coil end 13e along the lead wires 15, and flow into the inside of the terminal block 100.

Figure 3:
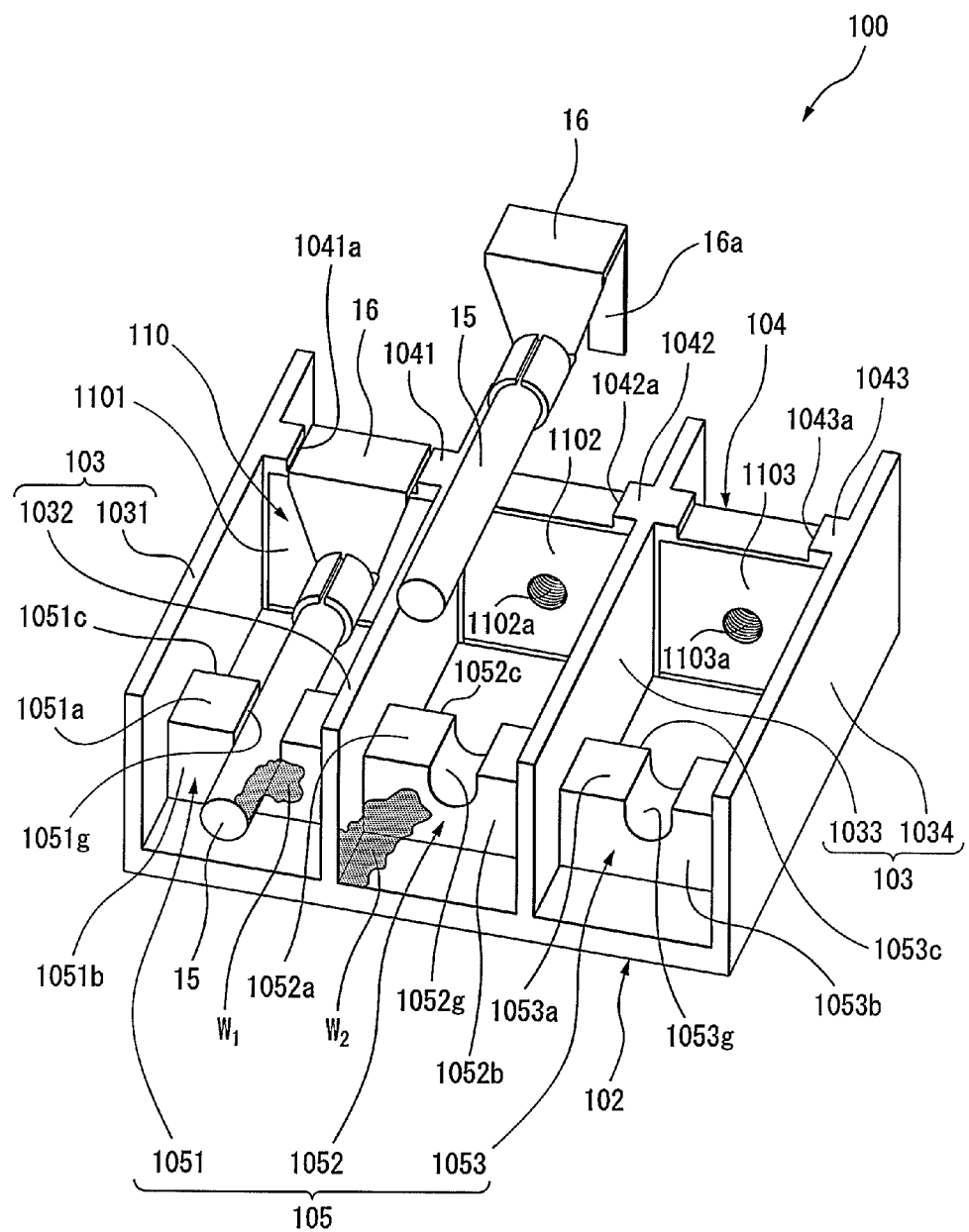
FIG. 3 is a view for explaining the function of a dam wall.

The state where the varnish W flows into the inside of the terminal block 100 is shown in FIG. 3. In FIG. 3, varnish $W_1$ travels along the first lead wire 15 which is connected to the first terminal part 1101, and flows into the inside of the terminal block 100. On the other hand, varnish $W_2$ travels along the edge where the bottom wall 102 and the second side wall 1032 are connected to each other, and flows into the inside of the terminal block 100.

The terminal block 100 according to the present embodiment is provided with a dam wall 105 which is arranged at a position closer to the coil end 13e than the terminal part 110 and which is formed integrally with the bottom wall 102 and the side wall 103 without clearance. Due to this dam wall 105, the varnish W which flows from the coil end 13e to the inside of the terminal block 100 can be stopped before reaching the terminal part 110.

Specifically, the varnish $W_1$ which flows in by traveling along the first lead wire 15 is stopped by the first dam wall 1051. As explained above, the wall surface of the groove 1051g provided at the first dam wall 1051 includes a circumferential surface which has a radius same as or somewhat smaller than the radius of the outer circumferential surface of the lead wire 15, and as a result, tightly contacts the outer circumferential surface of the lead wire 15. Therefore, the varnish $W_1$ which flows in by traveling along the first lead wire 15 cannot enter into the groove 1051g and, due to this, is stopped at the position of the rear end face 1051b of the first dam wall 1051.

On the other hand, the varnish $W_2$ which flows in by traveling along the bottom wall 102 is stopped by the second dam wall 1052. As explained above, the dam wall 105 is formed integrally with the bottom wall 102 and side wall 103 without clearance, so the varnish $W_2$ can be reliably stopped by the second dam wall 1052.

In this way, according to the present embodiment, before the varnish W which flows from the coil end 13e into the inside of the terminal block 100 reaches the terminal part 110, it can be reliably dammed by the dam wall 105. Due to this, the varnish W can be prevented from entering the screw parts 1102a and 1103a of the terminal part 110, and therefore it is possible to reliably connect the lead wires 15 and the external cables, and prevent the obstruction of work of inserting the external cables into the screw parts of the terminal part 110 due to the varnish W flown in.

Further, according to the present embodiment, when connecting lead wires 15 to the terminal block 100, it is possible to easily and stably set the lead wires 15 on the terminal block 100 only by fitting lead wires 15 into the grooves 1051g, 1052g, and 1053g. Note that, even if only half circumference of the lead wires 15 in the bottom side are held by the upward opening grooves 1051g, 1052g, and 1053g, it is possible to sufficiently dam the varnish W.

This will be explained below. As explained above, in the state where the terminal block 100 is fastened to the terminal block mount 14, the bottom wall 102 is arranged near the coil end 13e. Therefore, many of the varnish W flowing from the coil end 13e into the terminal block 100, as with the varnish $W_2$ shown in FIG. 3, travels along the bottom wall 102.

Further, regarding the varnish $W_1$ which flows into the terminal block 100 by traveling along the lead wires 15 as well, this tends to travel over the sides closer to the bottom wall 102. For this reason, as in the present embodiment, even if holding only the bottom sides of the lead wires 15 by the upward opening grooves 1051g, 1052g, and 1053g, it is possible to prevent the varnish W from reaching the terminal part 110 with a high certainty, since the dam wall 105 can reliably stop the varnish W between the bottom wall 102 and the lead wires 15.

Further, according to the present embodiment, the dam wall 105 has an x-axial direction length of 0.5 times or more of the diameter of the lead wires 15. Due to this, the varnish $W_1$ which flows in by traveling along the lead wires 15 can be more reliably stopped by the dam wall 105. Specifically, even if part of the varnish $W_1$ enters into the groove 1051g, the path by which the varnish W moves forward inside the groove 1051g and reaches the front end face 1051c of the first dam wall 1051 becomes substantially longer. For this reason, it becomes hard for the varnish $W_1$ to reach the front end face 1051c, and therefore the varnish $W_1$ can be reliably stopped inside the groove 1051g.

Figure 4A:
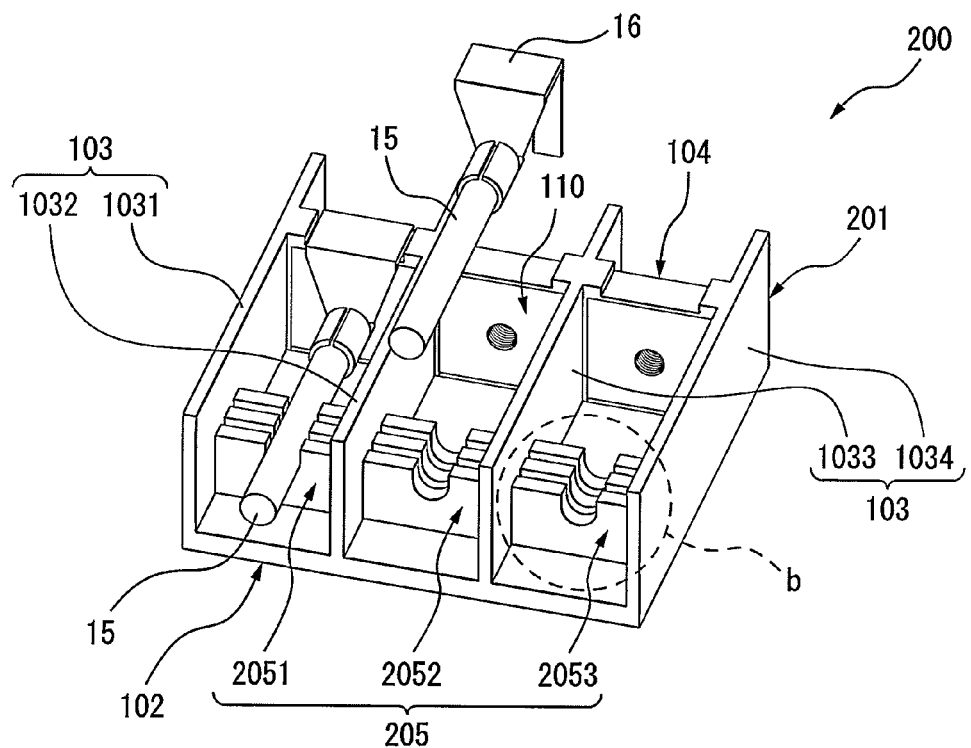
FIG. 4A is a perspective view of a terminal block according to another embodiment of the present invention and corresponds to FIG. 2.
Figure 4B:
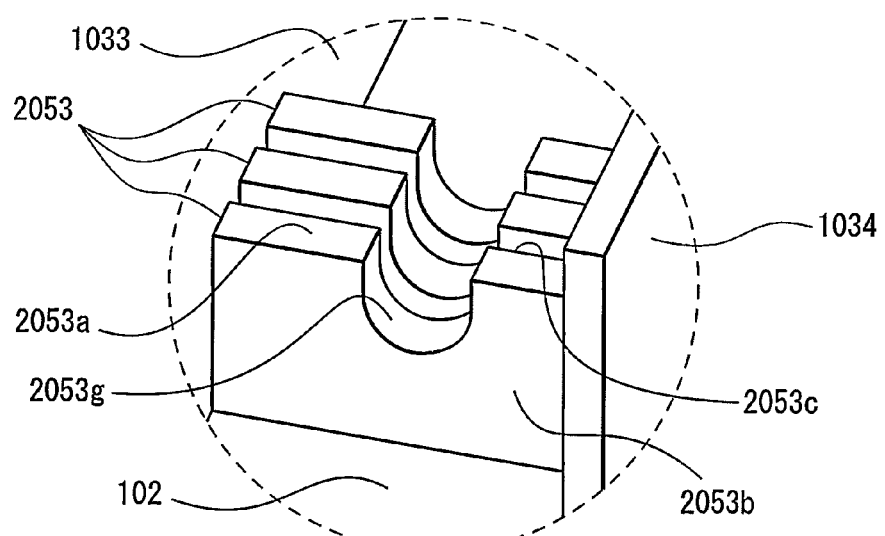
FIG. 4B is an enlarged view of a region "b" in FIG. 4A enlarged.

Next, referring to FIGS. 4A and 4B, a terminal block 200 according to another embodiment of the present invention will be explained. Note that, elements similar to the above embodiment will be assigned the same reference numerals and detailed descriptions thereof will be omitted. The terminal block 200 according to the present embodiment is provided with a housing 201; and a terminal part 110 attached to the housing 201. The housing 201 has a bottom wall 102; a side wall 103 which include a first side wall 1031, second side wall 1032, third side wall 1033, and fourth side wall 1034; a terminal holding wall 104; and a dam wall 205 according to the present embodiment.

The dam wall 205 is formed integrally with the bottom wall 102 and side wall 103 without clearance. Specifically, the dam wall 205 includes a plurality of first dam walls 2051 which extend between the first side wall 1031 and the second side wall 1032; a plurality of second dam walls 2052 which extend between the second side wall 1032 and the third side wall 1033; and a plurality of third dam walls 2053 which extend between the third side wall 1033 and the fourth side wall 1034.

Below, referring to FIG. 4B, the configuration of the third dam walls 2053 will be explained. In the present embodiment, a total of three third dam walls 2053 are formed aligned in the x-axial direction separated from each other at substantially equal intervals. Each of the third dam walls 2053 has a groove 2053g which is formed to be recessed inward from the top end face 2053a.

Similar to the above embodiment, the groove 2053g extends along the x-axis from the rear end face 2053b to the front end face 2053c of the third dam wall 2053, and has a wall surface corresponding to the outer circumferential surface of the lead wire 15. Each of the third dam walls 2053 has an x-axial direction length which is shorter than the dam walls 1051, 1052, and 1053 according to the above embodiments. Note that, each of the first dam wall 2051 and second dam wall 2052 has a shape similar to the third dam wall 2053, so detailed descriptions will be omitted.

According to the present embodiment, varnish which flows inside of the terminal block 200 can be more effectively stopped by the dam wall 205. Specifically, assuming that varnish W which has flowed inside of the terminal block 200 by traveling along the lead wires 15 or bottom wall 102 enters into the groove 2053g of the third dam wall 2053 positioned at the rear-most side (that is, the front side of FIG. 4B), reaches the front end face 2053c of this third dam wall 2053, and flows out from the groove 2053g to frontward.

Here, a gap having a predetermined x-axial direction distance is formed between the adjacent third dam walls 2053 in the x-axial direction. Accordingly, even if varnish W passes over one third dam wall 2053, this varnish W will be caught in the gap formed between the adjacent third dam walls 2053 in the x-axial direction.

In this way, according to the present embodiment, due to the presence of the gap between the adjacent dam walls 205 in the x-axial direction, the path over which the varnish W flows from the rear-most dam wall 205 to the front-most dam wall 205 can be much longer, and this gap functions as a "catch basin" for preventing the flow of the varnish W. Due to this, the varnish W can be more reliably stopped by the dam wall 205.

Figure 5A:
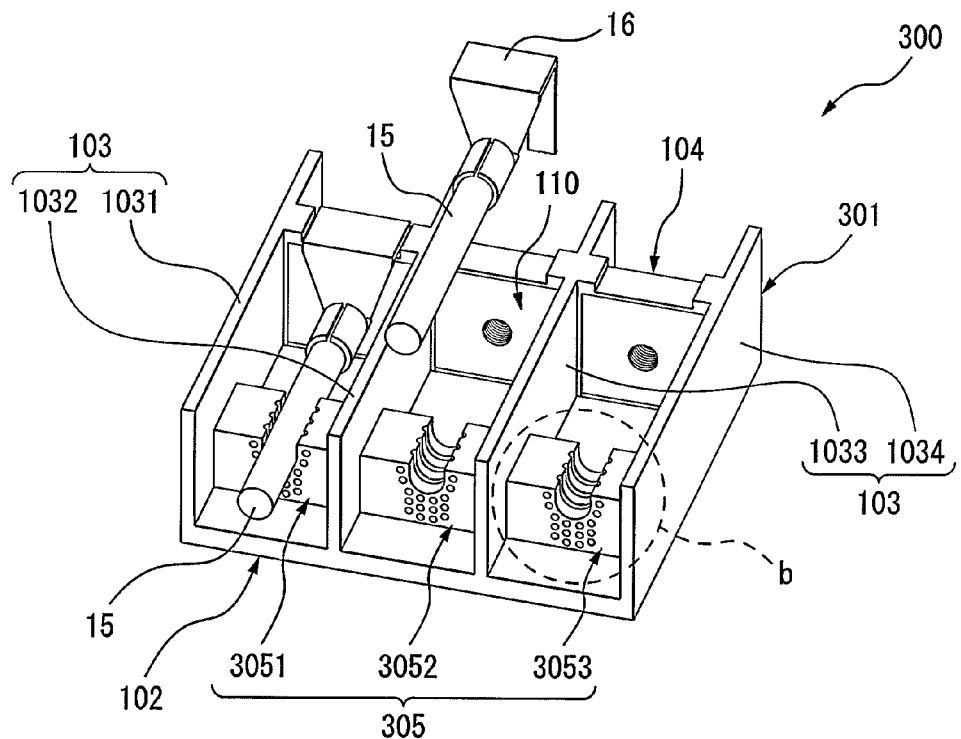
FIG. 5A is a perspective view of a terminal block according to still another embodiment of the present invention and corresponds to FIG. 2
Figure 5B:
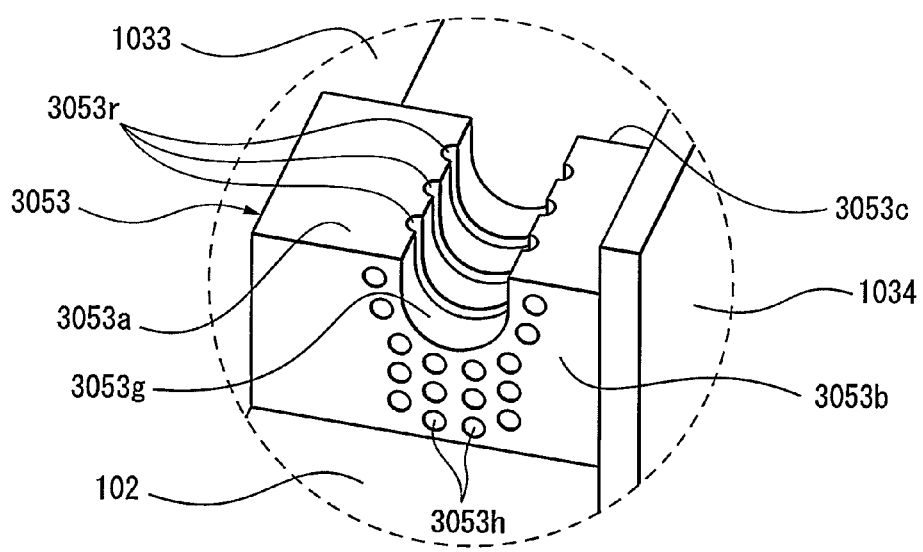
FIG. 5B is an enlarged view of a region "b" in FIG. 5A enlarged.

Next, referring to FIGS. 5A and 5B, a terminal block 300 according to still another embodiment of the present invention will be explained. Note that, elements similar to the above embodiments will be assigned the same reference numerals and detailed descriptions thereof will be omitted. The terminal block 300 according to the present embodiment is provided with a housing 301; and a terminal part 110 attached to the housing 301. The housing 301 has a bottom wall 102; a side wall 103 which include a first side wall 1031, second side wall 1032, third side wall 1033, and fourth side wall 1034, a terminal holding wall 104, and a dam wall 305 according to the present embodiment.

The dam wall 305 is integrally formed with the bottom wall 102 and side wall 103 without clearance. Specifically, the dam wall 305 includes a first dam wall 3051 which extends between the first side wall 1031 and the second side wall 1032; a second dam wall 3052 which extends between the second side wall 1032 and the third side wall 1033; and a third dam wall 3053 which extends between the third side wall 1033 and the fourth side wall 1034.

Below, referring to FIG. 5B, the configuration of the third dam wall 3053 will be explained. In the present embodiment, the third dam wall 3053 has a groove 3053g which is formed to be recessed inward from the top end face 3053a. Similar to the above embodiments, the groove 3053g extends along the x-axis from the rear end face 3053b to the front end face 3053c of the third dam wall 3053, and has a wall surface corresponding to the outer circumferential surface of a lead wire 15.

Here, in the present embodiment, a plurality of recessed parts 3053r, which are formed to be recessed inward from the wall surface of the groove 3053g, are formed aligned separated from each other in the x-axial direction. Each of the recessed parts 3053r extends over the circumference of the wall surface of the groove 3053g. In the present embodiment, a total of three recessed parts 3053r are formed aligned in the x-axial direction at equal intervals.

Further, at the rear end face 3053b of the third dam wall 3053, a plurality of holes 3053h which are recessed inward from the rear end face 3053b (do not pass through to the front end face 3053c) are formed. Note that, each of the first dam wall 3051 and the second dam wall 3052 has a similar shape as the third dam wall 3053, so detailed descriptions will be omitted.

According to the present embodiment, varnish which flows inside of the terminal block 300 can be more effectively stopped by the dam wall 305. Specifically, assuming that part of the varnish W flowing into the terminal block 300 enters the groove 3053g of the third dam wall 3053.

In this case, the varnish W entered must move inside the groove 3053g to frontward so as to pass over a total of three recessed parts 3053r, before it reaches the front end face 3053c of the third dam wall 3053. Due to the presence of the recessed parts 3053r, the path over which the varnish W passes inside the groove 3053g becomes substantially longer, and each of the recessed parts 3053r acts as a "catch basin" for preventing the flow of the varnish W. For this reason, it becomes hard for the varnish W to reach the front end face 3053c, and therefore the varnish W can be reliably stopped inside the groove 3053g.

Furthermore, the holes 3053h formed on the rear end face 3053b of the third dam wall 3053 also make the path of the varnish W over the rear end face 3053b substantially longer, and each of the holes 3053h functions as a "catch basin" for preventing the flow of the varnish W. Due to this, it becomes further harder for the varnish W to reach the front end face 3053c, and therefore the varnish W can be stopped more reliably.

Next, referring to FIG. 6, a terminal block 400 according to still another embodiment of the present invention will be explained. Note that, elements similar to the above embodiments will be assigned the same reference numerals and detailed descriptions thereof will be omitted. The terminal block 400 according to the present embodiment is provided with a housing 401; and a terminal part 110 attached to the housing 401. The housing 401 has a bottom wall 102; side wall 103 which include a first side wall 1031, second side wall 1032, third side wall 1033, and fourth side wall 1034; a terminal holding wall 104; and a dam wall 405 according to the present embodiment.

The dam wall 405 is formed integrally with the bottom wall 102 and side wall 103 without clearance. Specifically, the dam wall 405 includes a first dam wall 4051 extending between the first side wall 1031 and the second side wall 1032, a second dam wall 4052 extending between the second side wall 1032 and the third side wall 1033, and a third dam wall 4053 extending between the third side wall 1033 and the fourth side wall 1034. The first dam wall 4051, second dam wall 4052, and third dam wall 4053 respectively include a groove 4051g, groove 4052g, and groove 4053g, in the same way as the embodiment shown in FIG. 2.

Here, the dam wall 405 according to the present embodiment is made of a porous material capable of absorbing the varnish W. For example, the dam wall 405 is made of urethane foam. Thus, the housing 401 according to the present embodiment is made of two different materials. Such a housing 401 can be fabricated, for example, by two-color molding including a resin material which forms the bottom wall 102, side wall 103, and terminal holding wall 104; and urethane foam which forms the dam wall 405.

According to the present embodiment, it is possible to absorb the varnish W flowing along the dam wall 405 by the porous material, and therefore, more effectively stop the varnish flowing inside of the terminal block 400 by the dam wall 405.

Note that, in the above-mentioned embodiments, the case where as the lead wire holding part, a groove part which contacts the outer circumferential surface over half the circumference at the bottom side of the outer circumferential surface of the lead wire was explained. However, the invention is not limited to this. The lead wire holding part may include a through hole which is formed in the dam wall and which contacts the outer circumferential surface of the lead wire so as to surround the entire circumference of the outer circumferential surface.

Further, the case of forming recessed parts which extend across the circumference of the wall surface of the groove in the embodiment which is shown in FIG. 5 was explained. However, the invention is not limited to this. For example, it is also possible to form a plurality of holes which are recessed inward from the wall surface of the groove. Further, by forming not only the recessed parts, but also projecting parts which project outward from the wall surface of the groove, it is possible to de facto lengthen the path over which the varnish passes in the groove.

Figure 6:
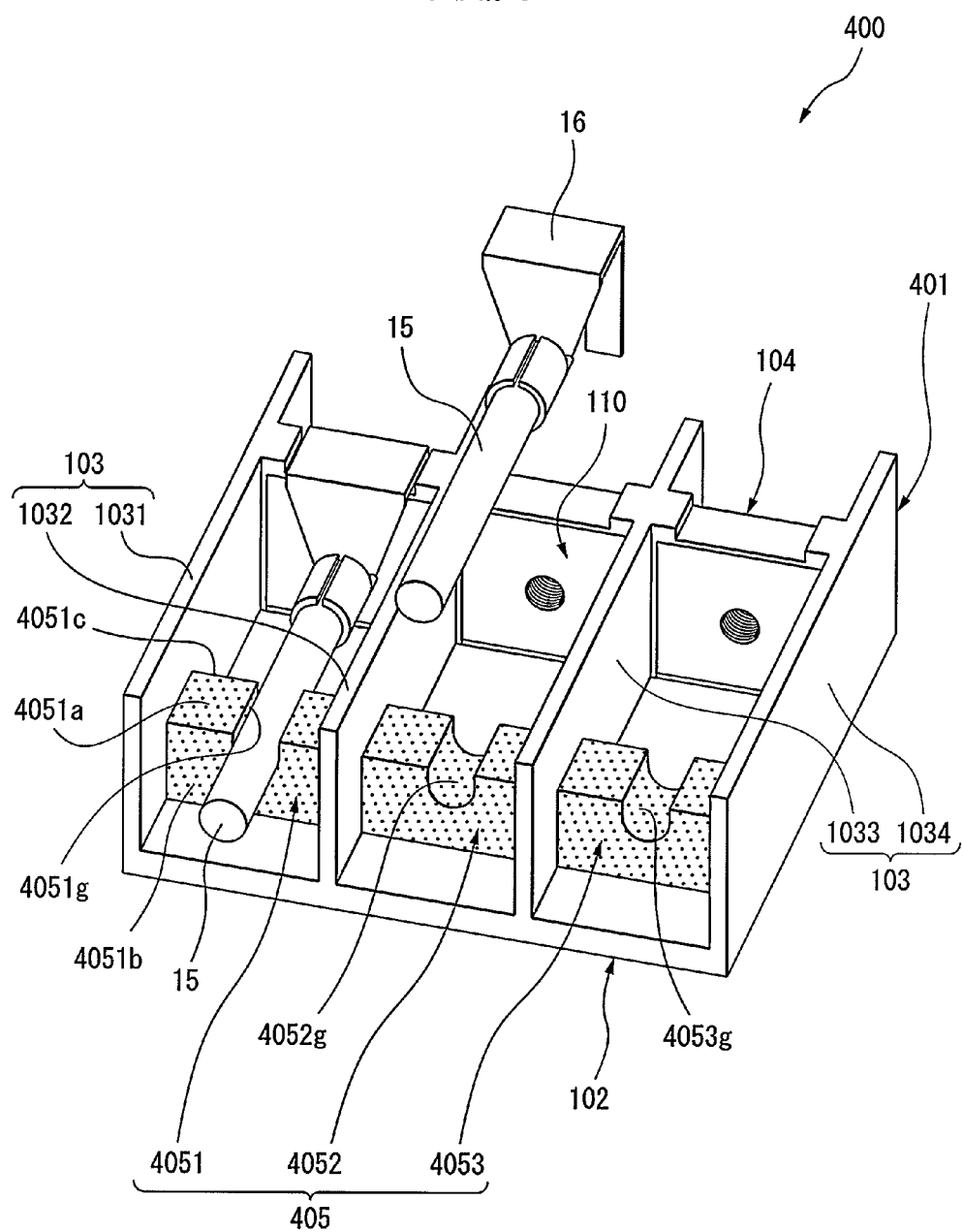
FIG. 6 is a perspective view of a terminal block according to still another embodiment of the present invention and corresponds to FIG. 2.

Further, in the embodiment which is shown in FIG. 6, the case of forming the dam wall by a porous material which can absorb varnish was explained. However, the invention is not limited to this. For example, it is also possible to cover the surface of the dam wall with a porous material. In this way, from the viewpoint of de facto lengthening the path over which the varnish passes, the dam wall should include a porous material which can absorb varnish at least at its surface.

According to the present invention, when impregnating varnish in the coils, the varnish which flows in from the coil ends of the coils to the inside of the terminal block can be reliably stopped by the dam wall before reaching the terminal part. Due to this, it is possible to prevent varnish from ending up entering into the terminal part, so the lead wires and the external cables can be made to reliably connect and the varnish can be prevented from causing the work of inserting the external cables into the screw parts of the terminal parts to be obstructed.

Above, the present invention was explained through embodiments of the present invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the present invention as clear from the claim language.

The invention claimed is:

1. A motor, comprising:
  a coil that is wound around a stator and a varnish impregnated in the coil; and
  a terminal block to which a lead wire of the coil is connected, wherein
  the terminal block includes:
  a bottom wall;
  a first side wall and second side wall extending from the bottom wall so as to face each other;
  a terminal part that is provided between the first side wall and the second side wall and a front end of the lead wire is connected to the terminal part; and
  a dam wall that is arranged at a position closer to the coil than the terminal part and the dam wall is formed integrally with the bottom wall, the first side wall, and the second side wall without clearance, the dam wall being spaced apart from a rear end part of the terminal block so as to define a reservoir bound by the rear end part, the first side wall, the second side wall and the dam wall, the reservoir is configured to collect varnish flowing toward the terminal block, wherein
  the dam wall includes a lead wire holding part for holding the lead wire.

2. The motor according to claim 1, wherein the terminal block includes a plurality of dam walls which are arranged separated from each other in the extension direction of the lead wire.

3. The motor according to claim 1, wherein the bottom wall is fastened to a position closer to a coil end of the coil than the stator.

4. The motor according to claim 1, wherein
the lead wire holding part has a wall surface of a shape corresponding to at least part of the outer circumferential surface of the lead wire, the wall surface contacting the outer circumferential surface of the lead wire.

5. The motor according to claim 4, wherein a recessed part is formed on at least part of the wall surface of the lead wire holding part.

6. The motor according to claim 1, wherein a recessed part is formed on at least part of the end face of the dam wall opposite to the terminal part.

7. The motor according to claim 1, wherein the dam wall includes a porous material which can absorb the varnish at least at its surface.

8. The motor according to claim 1, wherein the dam wall has a length of 0.5 times or more of the diameter of the lead wire in the extension direction of the lead wire.

9. The motor according to claim 1, wherein the lead wire holding part is formed to be recessed inward from the top end face of the dam wall and includes a groove extending in the extension direction of the lead wire.

\* \* \* \* \*